United States Patent [19]

Schad et al.

[11] Patent Number: 4,836,767

[45] Date of Patent: Jun. 6, 1989

[54] SWING PLATE MOLDING MACHINE

[75] Inventors: Robert D. Schad, Toronto; John Pocock, Willowdale, both of Canada

[73] Assignee: Husky Injection Molding System, Ltd., Bolton, Canada

[21] Appl. No.: 125,598

[22] Filed: Nov. 25, 1987

[51] Int. Cl.$^4$ .............................................. B29C 45/40
[52] U.S. Cl. .................... 425/552; 264/237; 264/297.3; 264/328.16; 425/556; 425/576; 425/588
[58] Field of Search ............... 425/526, 533, 534, 537, 425/539, 540, 556, 576, 588, 547, 552; 264/237, 297.3, 328.14, 328.16

[56] References Cited

U.S. PATENT DOCUMENTS

| | | | |
|---|---|---|---|
| 3,384,930 | 5/1968 | Rees | 425/590 |
| 4,144,010 | 3/1979 | Fenner | 425/576 |
| 4,201,535 | 5/1980 | Ninneman | 425/547 |
| 4,439,133 | 3/1984 | Rees et al. | 425/556 |
| 4,522,581 | 6/1985 | Schad et al. | 425/534 |
| 4,690,633 | 9/1987 | Schad et al. | 425/526 |
| 4,721,452 | 1/1988 | Delfer, III | 425/547 |
| 4,729,732 | 3/1988 | Schad et al. | 425/526 |

Primary Examiner—Richard L. Chiesa
Assistant Examiner—Timothy W. Heitbrink
Attorney, Agent, or Firm—Bachman & LaPointe

[57] ABSTRACT

The present invention relates to an apparatus for producing molded plastic articles which is capable of simultaneously producing and cooling the plastic articles. The apparatus has a stationary mold half having at least one cavity, at least two mating mold portions, each having at least one core element, mounted to a movable carrier plate which aligns a first one of the mating mold portions with the stationary mold half and positions a second of the mating mold portions in a cooling position, a device for cooling the molded plastic article(s) when in the cooling position, and a device for moving the carrier plate along a first axis so that the aligned mold portion abuts the stationary mold half and the second mating mold portion simultaneously brings each plastic article(s) thereon into contact with the cooling device. The carrier plate is also rotatable about an axis parallel to the first axis to permit different ones of the mating mold portions to assume the aligned position during different molding cycles.

10 Claims, 2 Drawing Sheets

SWING PLATE MOLDING MACHINE

BACKGROUND OF THE INVENTION

The present invention relates to the art of injection molding hollow plastic articles especially hollow plastic articles which are blow molded into containers such as oriented hollow plastic containers and to the art of injection molding large capacity shipping containers.

A high rate of production is important in commercial operation involving the injection molding of plastic articles. The rate at which an injection molding cycle can produce plastic articles is limited by the time it takes to cool the articles to permit damage-free post molding handling. When forming a relatively thick walled part, the major portion of the cycle time for injection molding is the mold cooling time—the time during the cycle after the mold has been filled and packed with resin and before the part is ejected from the mold.

Examples of thick walled parts are preforms, molded in polyethylene terephthalate (PET), with wall thicknesses on the order of 0.060 to 0.080 inches and four and five gallon shipping containers, molded in high density polyethylene (HPDE), with wall thicknesses of 0.0035 to 0.050 inches. Preforms typically have a total molding cycle of 19 to 30 seconds and shipping containers have a cycle of 23 to 30 seconds. The cooling time portion of these cycles is typically one third to one half of the total cycle, and in some cases can be higher.

The processing of PET resin forms the chemical acetaldehyde (AA) which can impart an undesirable taste to the contents of containers molded from PET. The amount of acetaldehyde generated during processing bears a linear relationship with the time taken to process and an exponential relationship with the temperature of the PET during processing. Techniques which significantly reduce the amount of acetaldehyde generated during PET processing are quite desirable.

One known injection molding technique is shown in U.S. Pat. No. 3,384,930 to Rees. A machine capable of interchanging mold cores is used in this technique. The machine is used to injection mold closures having internal threads which have to be unscrewed from the mold cores. By being able to remove the first set of cores with the molded closures and inserting a second set of cores into the mold, the first set of closures can be unscrewed during the same time that a second set of closures are being molded on the second set of cores. In this technique, cooling is performed during the complete cycle before the mold is opened. As a result, the total cycle time is not reduced. Another disadvantage of this approach is that the closures must be sufficiently cooled and strong enough before unscrewing can begin. The time for the unscrewing operation is determined by the pitch and number of turns of the thread required to disengage the closures from the cores. Consequently, the unscrewing time could be as long as the complete molding cycle including cooling time.

U.S. Pat. No. 4,439,133 to Rees et al. illustrates another example of a machine capable of interchanging mold cores. The machine uses a four faced turret to carry mold cores for forming PET preforms. Each of the four faces can be inserted into the mold to produce preforms. During the same time one set of cores is forming preforms, the other sets are in locations for cooling and ejecting the previously molded parts. One disadvantage with a turret arrangement is that a large machine opening stroke is required for each cycle. This extends the cycle time and offsets gains achieved by simultaneous performance of the cooling operation. A second disadvantage with a turret system is that the turret mechanism is very complex since all four faces must carry a core half and its associated ejection mechanism. This additional complexity increases cost and the risk of a mechanical failure resulting in downtime.

Some injection molding techniques require a cooling time which exceeds the remaining portion of the cycle time. As a result, parts formed during these techniques will not be completely cooled before the next set of molded parts is ready to begin cooling and/or before the first set of cores is required to be inserted into the mold to begin the next molding cycle.

U.S. patent application Ser. No. 31,655, filed Mar. 30, 1987 to Schad et al., which is a division of U.S. patent application Ser. No. 733,969, filed May 14, 1975, which is in turn a continuation-in-part of U.S. Pat. No. 4,522,581, illustrates an example of post cooling of preforms. In this approach, a tapered cooled tube is mounted on a robot tooling plate for transporting the partially cooled preform out of the mold while continuing cooling.

A second example of post cooling preforms is disclosed in U.S. patent application Ser. No. 29,166, filed Mar. 23, 1987, to Delfer III. In this approach, a cooled storage plate is used to store and cool sequential cycles of preforms as they are ejected in a partially cooled condition from the mold. The disadvantages of this technique include the required length of the opening stroke and the time required to permit insertion and retraction of the cooled storage plate.

Accordingly, it is an object of the present invention to provide an injection molding apparatus capable of significantly reducing molding cycle time and thereby increase the throughput of the plastic material being processed.

It is a further object of the present invention to provide an apparatus as above capable of significantly reducing the amount of acetaldehyde generated during PET processing by reducing the time the PET is in an elevated temperature state in the apparatus and mold.

It is yet a further object of the present invention to Provide an injection molding apparatus as above which achieves a higher production rate without increasing the number of mold cavities It is yet another object of the present invention to provide an injection molding apparatus as above capable of simultaneously performing cooling of a set of plastic articles and the next sequential molding cycle.

It is still another object of the present invention to provide an injection molding apparatus as above capable of continuous cooling after the molded parts have been ejected from the mold core.

These and other objects and advantages will become more apparent from the following description and drawings.

SUMMARY OF THE INVENTION

In accordance with the present invention, the total cycle time required to form a plastic article is reduced by using an injection molding apparatus capable of cooling plastic articles formed during a first molding cycle while performing the next sequential molding cycle. Using the apparatus of the present invention, it is possible to open a mold, remove a first mold core and the partially cooled plastic article or articles thereon, insert a second core, and while the second core is in a mold closed position and a second set of molded plastic article(s) is being formed, continue cooling of the first plastic article or articles.

The injection molding apparatus of the present invention comprises a stationary mold half having at least one cavity therein, at least two mold core portions affixed to a carrier plate reciprocably movable along a first axis so that during a first cycle a first of the mold core portions is aligned with the stationary mold half and the other of the mold core portions is in a non-aligned or outboard position, means for rotating the carrier plate so that during a second cycle the first mold core portion is in said non-aligned position and the second mold core portion is aligned with the stationary mold half, and means for cooling the plastic article(s) formed during the previous molding cycle simultaneous with the formation of another set of plastic article(s) during a second molding cycle. In a first embodiment, the cooling means comprises a rotatable member having four tooling plates, each carrying a number of cooling tubes equal to the number of mold core elements. In a second embodiment, the cooling means comprises at least one cooling block or plate pressed against the plastic article on the core portion in the non-aligned position.

DETAILED DESCRIPTION

As previously discussed, the present invention relates to injection molding systems which re able to simultaneously form at least one molded plastic article and cool the plastic article or articles formed during a previous molding cycle. It has been found that such systems have a reduced total cycle time which increases throughput of the plastic and in the case of PET processing reduces the amount of generated acetaldehyde. Another benefit of these systems is that a higher production rate can be achieved without increasing the number of mold cavities.

Figure 1:
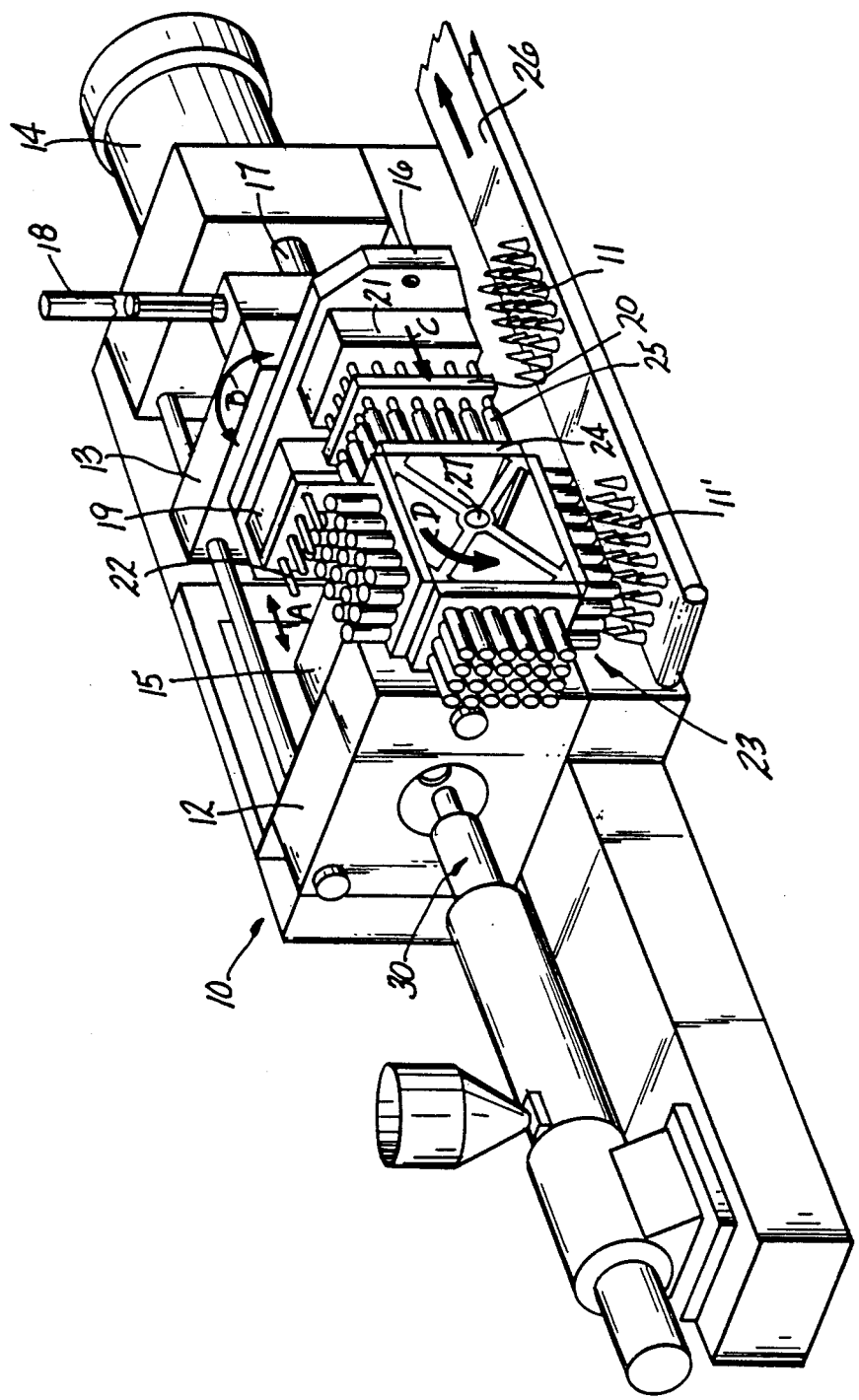
FIG. 1 illustrates an injection molding system for producing PET preforms.

Referring now to the drawings, FIG. 1 shows an apparatus for producing hollow plastic articles or preforms 11, 11' according to the present invention including a horizontal injection molding machine 10 comprising a multicavity machine. Naturally, the number of cavities and core elements and the arrangement thereof shown in the drawings are merely illustrative and any desired number of cavities and core elements and any desired arrangement thereof may be employed.

Machine 10 includes a stationary platen 12 having a first mold portion 15 which is a cavity half mounted thereto, two second mold portions 19 and 21, which are each a core half, mounted to a movable carrier plate 16, a moving platen 13 attached to the carrier plate 16, means 30 for injecting resin into the mold in a known manner, and motive means 14 such as a hydraulic cylinder for moving the platen 13 and providing a clamping force between the two platens 12 and 13. The first mold portion or cavity half 15 has at least one cavity therein and preferably a plurality of cavities not shown. Each second mold portion or core half has at least one elongate core 22 therein with the number of cores corresponding to the number of cavities and a stripper plate or ejection mechanism 20. Cores 22 are each engageable with a respective cavity for seating therein during a mold-closed position to form a closed mold for the formation of hollow plastic article(s) 11 therein by injection molding. Of course, the number of articles formed in an injection molding cycle will depend on the number of cavities and corresponding cores.

The motive means 14 are used to reciprocally move the carrier plate 16 and the second mold portions 19 and 21 along an axis A between a mold-closed position wherein one of the second mold portions 19 and 21 mates with the stationary first mold portion 15 and a mold-open position wherein the second mold portions 19 and 21 are spaced from the first mold portion 15 a distance sufficient to permit withdrawal of the plastic articles 11 formed during the mold-closed portion of the molding cycle from the mold cavity or cavities. FIG. shows the mold portions in a mold-open position. During each molding cycle, the carrier plate 16 is oriented so that one of the second mold portions 19 and 21 is aligned to engage the first mold portion 15 while another of the second mold portions, for reasons to be explained in more detail hereinafter, assumes a non-aligned or outboard position.

The carrier plate 16 in addition to being axially movable can be rotated 180° about the tie bar 17 and an axis B' parallel to the direction of axial movement A. By providing such an arrangement, one of the second mold portions 19 can be aligned with the first mold portion 15 during a first molding cycle and the other of the second mold portions 21 can be aligned with the first mold portion 15 during a second molding cycle. Rotation of the carrier plate 16 permits the plastic article or articles 11 formed during a previous molding cycle to be cooled while a second plastic article or articles 11' are being formed during the next molding cycle. In other words, supplementary cooling of the article(s) formed during one molding cycle is effected when the plastic article(s) and the core element(s) they are positioned on are in the non-aligned position during a subsequent molding cycle. The carrier plate 16 may be mounted for rotation about the tie bar 17 in any desired manner. In addition, any suitable motive means known in the art such as a rack, pinion and cylinder arrangement 18 may be used to rotate the carrier plate.

The machine 10 further includes a post mold cooling device 23 for effecting the simultaneous cooling of the molded plastic article or articles. As shown in FIG. 1, the cooling device comprises a hub 27 adapted for rotation about an axis which is substantially perpendicular to the axis of rotation B' of the carrier plate 16. The cooling device further comprises four tooling plates 24, each carrying one or more cooling tubes 25, one each for the number of mold core elements 22. The cooling tubes 25 are in a pattern which corresponds to the pattern of the cavities in the stationary mold half 15. The device 23 may be mounted on the side of stationary platen 12 in any desired manner. Similarly any suitable means (not shown) known in the art may be used to rotate the device.

Each tube 25 is cooled by passing a cooling fluid through cooling passageways not shown in a known manner. A vacuum system not shown may also be provided in a known manner to hold the molded article or articles in the tube(s). Beneath the cooling device 23 is a take away conveyor 26 for transporting cooled preforms or other molded articles, while maintaining their oriented layout, to downstream equipment for further processing.

In operation, the motive means 14 moves the platen 13 towards the stationary platen 12 which causes the carrier plate 16 carrying the second mold portions 19 and 21 to move into a mold-closed position wherein a first one 19 of the mold portions is placed into mating contact with the first mold portion 15. Resin is injected into the closed mold through the injection equipment 30 in a known manner. The mold is opened after a time period sufficiently long enough to freeze off the gate. Generally, this is a relatively brief time period. When the mold is opened enough so that the molded plastic article or articles 11 are clear of the first mold portion 15 and the cavity or cavities therein, the carrier plate 16 is rotated 180°. This moves the molded articles 11 still on their core elements 22 to the non-aligned position and simultaneously swings another of the second mold portions 21 into alignment with the first mold portion 15. It is important to note that the opening stroke of the mold is minimized because one need only clear the cores from the cavities to allow swinging of the plate 16. Conventional molding machines on the other hand must open more than twice this distance to provide clearance for the ejection of the parts in between the open mold halves. Consequently, the present invention achieves a considerable time savings result from this shorter opening and closing stroke.

When the carrier plate 16 has completed its rotation, a second molding cycle begins wherein the motive means 14 causes the carrier plate 16 to move to the mold-closed position, the second mold portion 21 to move into abutting contact with the first mold portion 15, and the next shot of resin to be injected. The movement of the carrier plate 16 to the mold-closed position simultaneously moves the mold portion 19 in the non-aligned position and the plastic articles 11 thereon into contact with one set of cooling tubes 25 on the device 23. The stripper plate or ejection mechanism 20 is then activated in a known manner to eject the molded plastic articles or preforms into the cooled tubes in the direction of arrow C. After ejection has been completed, the stripper plate 20 is immediately retracted. The cooling device 23 is then rotated one quarter of a revolution in the direction of arrow D to present the next set of empty cooling tubes ready to receive the next set of molded articles. Just before rotation of the cooling device 23, the articles o preforms in the tubes immediately above the conveyor 26 are ejected from the tubes 25 and deposited onto the conveyor in the same oriented layout as the mold cores.

It can be seen that the molded articles remain in the cooling device 23 for more than three complete molding cycles, which provides an ample time for the thick wall sections of the parts to cool. By removing the time needed to adequately cool the wall parts from the molding cycle and performing this function simultaneously, a significant reduction in overall cycle time is achieved. For example, conventional molding cycles for PET preforms are typically in the range of 30 to 45 seconds where all the cooling is performed in the mold. The cycle can be improved to 20 to 25 seconds by using a robot and some form of post cooling means; however, the cycle is still penalized by the need to open the mold halves far enough to insert the robot, operate the stripper plate through its full stroke, and then extract the robot before closing the mold again. Using the method described above, molding cycles of 12 to 18 seconds are achievable.

Figure 2:
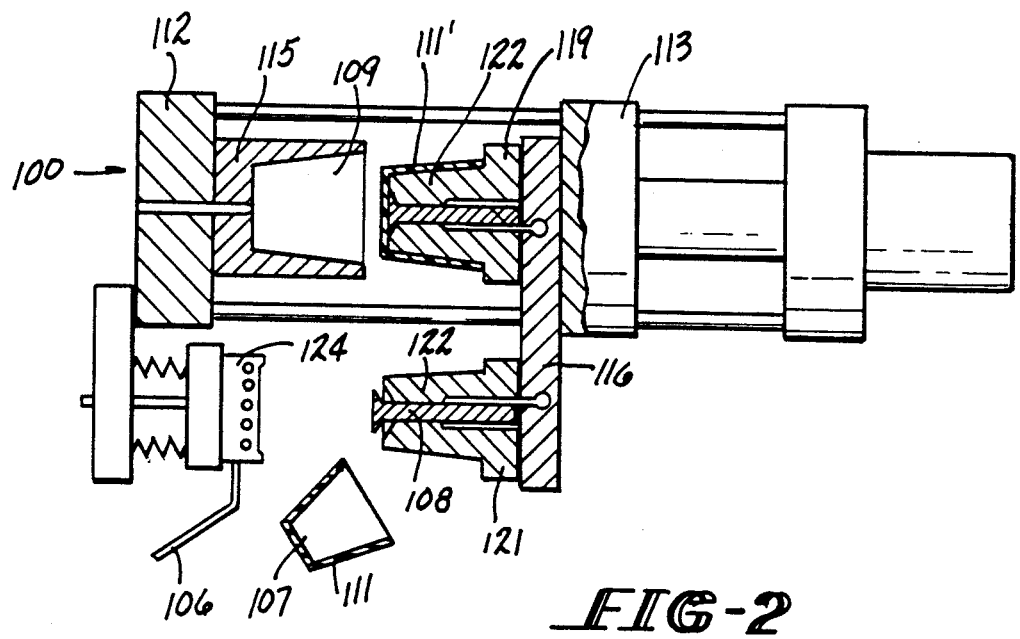
FIG. 2 illustrates an injection molding system in accordance with the present invention for producing shipping containers in a mold open position.
Figure 3:
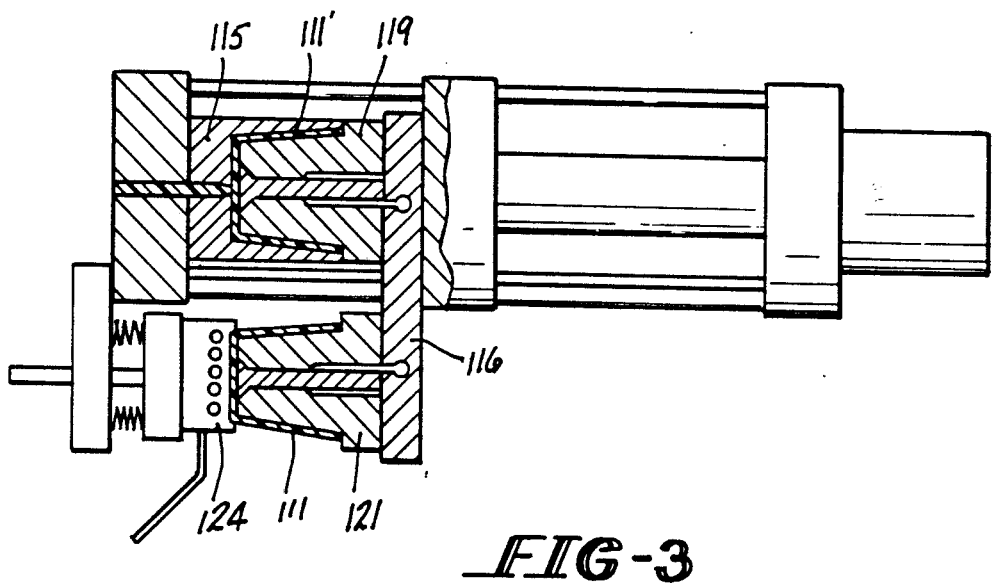
FIG. 3 illustrates the injection molding system of FIG. 2 in a mold closed position.

A second application of the present invention is illustrated in FIGS. 2 and 3 where an injection mold system 100 for producing shipping containers is shown. The injection molding machine 100 is similar to that shown in FIG. 1 in that it is equipped with a stationary platen 112 having a first mold portion 115 affixed thereto, with a single cavity 109, means for injecting resin into the mold, a movable platen 113, and a movable and rotatable mold carrier plate 116 having two second mold portions 119 and 121, respectively, each having a core element 122 and a mechanism 108 for ejecting molded containers 111, mounted thereto. The ejection mechanism 108 may comprise any suitable ejection device known in the art such as a hydraulically operated ram. This machine is primarily used for producing relatively large shipping containers.

The injection molding machine 100 differs from that shown in FIG. 1 in that a different type of cooling device is employed. In this system, the molded plastic article on the second mold portion in the non-aligned position is allowed to cool for as long as possible. The hottest portion of the molded part is the gate which is located in the center of the part's base. To increase the cooling of this portion, a cooling device 123 having at least one cooling block or plate 124 is pressed against the base of the molded article (see FIG. 3). If desired, each plate 124 may be contoured to match the shape of the base 107. Each plate 124 may be formed from any suitable material known in the art and may be connected to a source not shown of cooling fluid in a known manner such as by tubes 106. Any suitable means known in the art may be used to press the plate 124 against the base of the molded article.

In operation, the molded plastic article such as a shipping container is formed during a first molding cycle. As the mold is opened and the part is clear of the first mold portion 115 and its cavity 109, the carrier plate 116 is rotated 180°. As the next molding cycle begins, the cooling plate or plates 124 are brought into contact with the base of the article formed during the previous cycle. Thus, cooling of the article 111 formed during the first molding cycle is effected simultaneously with the formation of a second molded plastic article 111 in a second molding cycle. As the mold is being opened upon completion of the second mold cycle, the cooled plate 124 is withdrawn and the article 111 formed during the previous molding cycle is ejected from the core 122. The part is ejected by ejection mechanism 108.

In the system shown in FIGS. 2 and 3, there is no need to store the part in a cooling device similar to the one shown in FIG. 1 because there is sufficient time in the complete cycle to achieve cooling during the molding portion of the cycle. However, in an extreme case where additional cooling time is required such a device could be used. Using the system shown in FIGS. 2 and 3, it is possible to achieve a cycle time improvement from 23 seconds to 15 seconds. Once again, this significant cycle time improvement is realized by reducing the opening and closing stroke requirements of the system and simultaneous performance of the cooling function.

It is apparent that there has been provided in accordance with this invention, a swing plate moving machine which fully satisfies the objects, means, and advantages set forth hereinbefore. While the invention has been described in combination with specific embodiments thereof, it is evident that many alternatives, modifications, and variations will be apparent to those skilled in the art in light of the foregoing description. Accordingly, it is intended to encompass all such alternatives, modifications, and variations as fall within the spirit and broad scope of the appended claims.

What is claimed is:

1. An apparatus for producing molded plastic articles which comprises: an injection molding machine including a first mold portion; at least two mold portions for mating with said first portion; said mating portions being mounted to a movable carrier plate so that during a first molding cycle a first one of said mating mold portions is aligned with said first mold portion to permit the production of at least one molded plastic article and a second one of said mating portions is in a non-aligned position and during a second molding cycle said first mating molding portion with said at least one plastic article are in said non-aligned position and said second mating molding portion is aligned with said first mold portion; means for cooling said at least one plastic article in said non-aligned position; means for moving said carrier plate along a first axis so that during each molding cycle said mating molding portion in said aligned position is brought into contact with said first mold portion to form at least one plastic article and said mating molding portion in said non-aligned position is simultaneously brought into a cooling position wherein said at least one plastic article on said mating molding mean formed during a previous molding cycle contacts said cooling means; said cooling means comprising a plurality of plates connected to a rotatable hub; and each said plate having at least one cooling tube for receiving said at least one plastic article to be cooled.

2. An apparatus according to claim 1 wherein said first mold portion has at least one cavity and each said mating mold portion has at least one core element.

3. An apparatus according to claim 2 wherein each said mating mold portion further includes means for ejecting each said plastic article formed on each said core element.

4. An apparatus according to claim 1 wherein said moving means comprises means for reciprocably moving said carrier plate along said first axis between a mold-open position wherein an aligned mating mold portion is spaced from said first mold portion and a mold-closed position wherein an aligned mating mold portion abuts said first mold portion.

5. An apparatus according to claim 4 further comprising means for rotating said carrier plate about a second axis parallel to said first axis.

6. An apparatus according to claim 5 wherein said carrier plate rotating means rotates said carrier plate as said carrier plate moves from said mold-closed position to said mold-open position whereby the distance said plate moves along said first axis is reduced.

7. An apparatus according to claim 7 further comprising said hub being rotatable about a third axis substantially perpendicular to both said first and second axes and means for rotating said cooling means about said axis so that during different molding cycles said at least one cooling tube in different ones of said plates receive said plastic articles to be cooled.

8. An apparatus according to claim 7 further comprising means for holding said plastic articles in said cooling tubes and means for transporting cooled articles away from said cooling means.

9. An apparatus according to claim 7 first mold portion has at least two cavities in a particular pattern, each said mating portion has at least two core elements, and each said cooling plate has a number of cooling tubes corresponding to said number of core elements, said cooling tubes being arranged in a pattern corresponding to said pattern of said cavities.

10. An apparatus according to claim 5 wherein said rotating means comprises a cylinder and a rack and pinion mechanism communicating with said carrier plate.

* * * * *

UNITED STATES PATENT AND TRADEMARK OFFICE
CERTIFICATE OF CORRECTION

PATENT NO. : 4,836,767
DATED : June 6, 1989
INVENTOR(S) : Robert D. Schad et al.

It is certified that error appears in the above-identified patent and that said Letters Patent is hereby corrected as shown below:

Column 7, claim 1, line 31, "mean" should read --means--.

Column 8, claim 7, line 18, "claim 7" should read --claim 1--.

Column 8, claim 9, line 29, after "claim 7" --wherein said-- should be inserted.

Signed and Sealed this

Thirteenth Day of March, 1990

Attest:

JEFFREY M. SAMUELS

*Attesting Officer*  *Acting Commissioner of Patents and Trademarks*